US009209444B2

(12) United States Patent
Hou et al.

(10) Patent No.: US 9,209,444 B2
(45) Date of Patent: Dec. 8, 2015

(54) POLYIMIDE BLEND NANOFIBER AND ITS USE IN BATTERY SEPARATOR

(75) Inventors: Haoqing Hou, Nanchang (CN); Chuyun Cheng, Nanchang (CN); Shuiliang Chen, Nanchang (CN); Xiaoping Zhou, Nanchang (CN); Xiaoyi Lv, Nanchang (CN); Ping He, Nanchang (CN); Xiaoming Kuang, Nanchang (CN); Jinsheng Ren, Nanchang (CN)

(73) Assignee: JIANGXI ADVANCE NANOFIBER S&T CO., LTD., Nanchang Jiangxi (CN)

( * ) Notice: Subject to any disclaimer, the term of this patent is extended or adjusted under 35 U.S.C. 154(b) by 290 days.

(21) Appl. No.: 13/819,960

(22) PCT Filed: Sep. 30, 2010

(86) PCT No.: PCT/CN2010/077514
§ 371 (c)(1),
(2), (4) Date: Feb. 28, 2013

(87) PCT Pub. No.: WO2012/027917
PCT Pub. Date: Mar. 8, 2012

(65) Prior Publication Data
US 2013/0164629 A1     Jun. 27, 2013

(30) Foreign Application Priority Data
Sep. 1, 2010    (CN) .......................... 2010 1 0272414

(51) Int. Cl.
*H01M 2/16* (2006.01)
*C08G 73/10* (2006.01)
*D01F 6/74* (2006.01)
*D01F 6/96* (2006.01)
*D04H 1/728* (2012.01)
(Continued)

(52) U.S. Cl.
CPC ........... *H01M 2/162* (2013.01); *C08G 73/1046* (2013.01); *D01F 6/74* (2013.01); *D01F 6/96* (2013.01); *D04H 1/728* (2013.01); *D01D 5/0007* (2013.01); *H01M 2/145* (2013.01); *Y10T 428/298* (2015.01)

(58) Field of Classification Search
CPC ....................................................... H01M 2/16
See application file for complete search history.

(56) References Cited

U.S. PATENT DOCUMENTS

| 6,294,049 B1 | 9/2001 | Tomioka et al. | |
| 2008/0119616 A1* | 5/2008 | Donovan et al. | ............... 525/432 |
| 2009/0087749 A1* | 4/2009 | Takita et al. | ................... 429/249 |

FOREIGN PATENT DOCUMENTS

| CN | 101139746 A | 3/2008 |
| CN | 101589110 A | 11/2009 |

(Continued)

OTHER PUBLICATIONS

CN101139746 (MT).*
(Continued)

*Primary Examiner* — Patrick Ryan
*Assistant Examiner* — Alex Usyatinsky
(74) *Attorney, Agent, or Firm* — Sughrue Mion, PLLC

(57) ABSTRACT

A polyimide blend nanofiber and its use in battery separator are disclosed. The polyimide blend nanofiber is made of two kinds of polyimide precursors by high pressure electrostatic spinning and then high temperature imidization processing, wherein one of the polyimide precursor does not melt under high temperature, and the other is meltable at a temperature of 300-400° C. The polyimide blend nanofiber of present invention has high temperature-resistance, high chemical stability, high porosity, good mechanical strength and good permeability, and can be applied as battery separator.

9 Claims, 1 Drawing Sheet

(51) Int. Cl.
  *D01D 5/00*  (2006.01)
  *H01M 2/14*  (2006.01)

(56) References Cited

FOREIGN PATENT DOCUMENTS

| JP | 3-14617 A | 1/1991 |
| JP | 3-152211 A | 6/1991 |
| JP | 6-207315 A | 7/1994 |
| JP | 2009-243031 A | 10/2009 |

OTHER PUBLICATIONS

International Search Report for PCT/CN2010/077514 dated Jun. 9, 2011.

\* cited by examiner

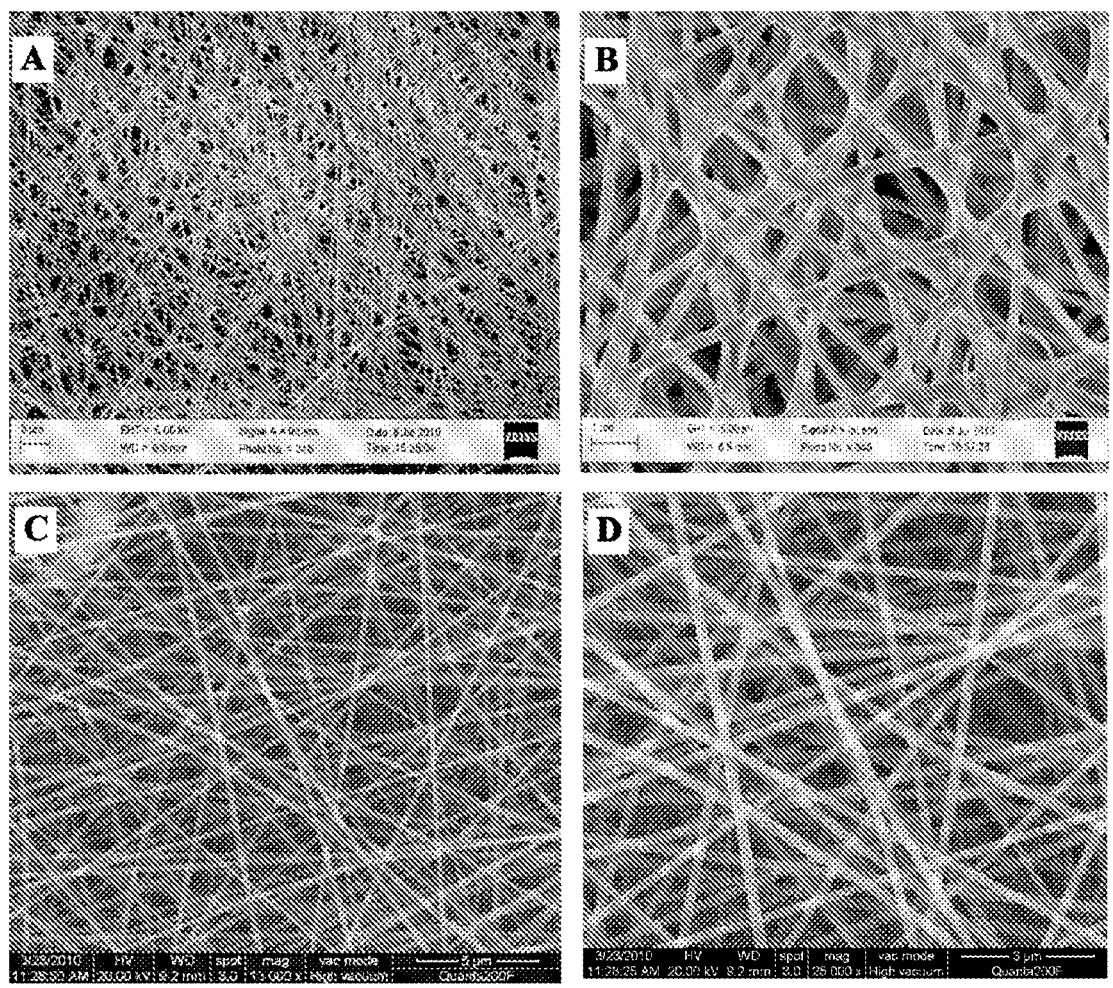

POLYIMIDE BLEND NANOFIBER AND ITS USE IN BATTERY SEPARATOR

FIELD OF THE UTILITY MODEL

The present invention relates to an electrostatic ally spun polyimide nanofibre and uses thereof, and in particular, a high temperature-resistant and high-porosity polyimide blend nanofibre which can be used in battery separators.

BACKGROUND OF THE UTILITY MODEL

In recent decades, lithium ion secondary batteries become one of the main energy sources for communication electronic products, with the advantages of a high specific energy, a high voltage, a small volume, a light weight, no memory, etc. However, in many cases, due to human misuse, the lithium ion secondary batteries easily lead to hidden troubles dangerous to the user safety such as smoking, firing, even explosion, etc., and therefore, such lithium ion secondary batteries of high capacity and high power have not been widely used in the fields, such as automobile power, etc., hitherto. Hence, improvement of the safety of the lithium ion batteries is a key to develop and generalize the application of lithium ion batteries in the fields such as automobile power, etc.

Current lithium ion battery separators, such as polyethylene (PE), polypropylene (PP), etc, all are difficult to ensure integrity at a high temperature, and the problem on thermal runaway caused by the internal short circuit in the battery due to the shrinkage of the battery separators also often occurs in safety tests such as of overheat, overcharge, etc. Hence, the selection for a high-heat resistant battery separator becomes one of keys to solving the safety of the lithium ion batteries.

Polyimide (PI) is an aromatic polymer containing imide rings on main chains, has excellent heat resistance, chemical stability, good mechanical performance and ultrahigh electrical insulation properties, and can be used as special engineering plastics, high performance fibres, selective permeation membranes, high temperature coatings, high temperature composite materials, etc. Hence, polyimide is a material which is very suitable to be used as high temperature-resistant safe battery separators. Previous documents have disclosed some schemes for solving the heat resistance of the battery separators, but the problem is not basically solved due to the reasons, such as insufficient mechanical strength or overlow porosity or overhigh internal resistance, etc.

SUMMARY OF THE UTILITY MODEL

Objects of the present invention are to provide a high temperature-resistant high-porosity polyimide blend nanofibre and use thereof in battery separators. The polyimide blend nanofibre is manufactured by subjecting a precursor of two polyimides to high-voltage electrostatic spinning and a high-temperature imidization treatment, and the polyimide blend precursor is composed of a bicomponent of a polyimide precursor nonmeltable at a high temperature and a polyimide precursor meltable at 300-400° C., The polyimide blend precursor is converted into a bicomponent polyimide blend by high temperature imidization, and the conversion is shown by the following formula:

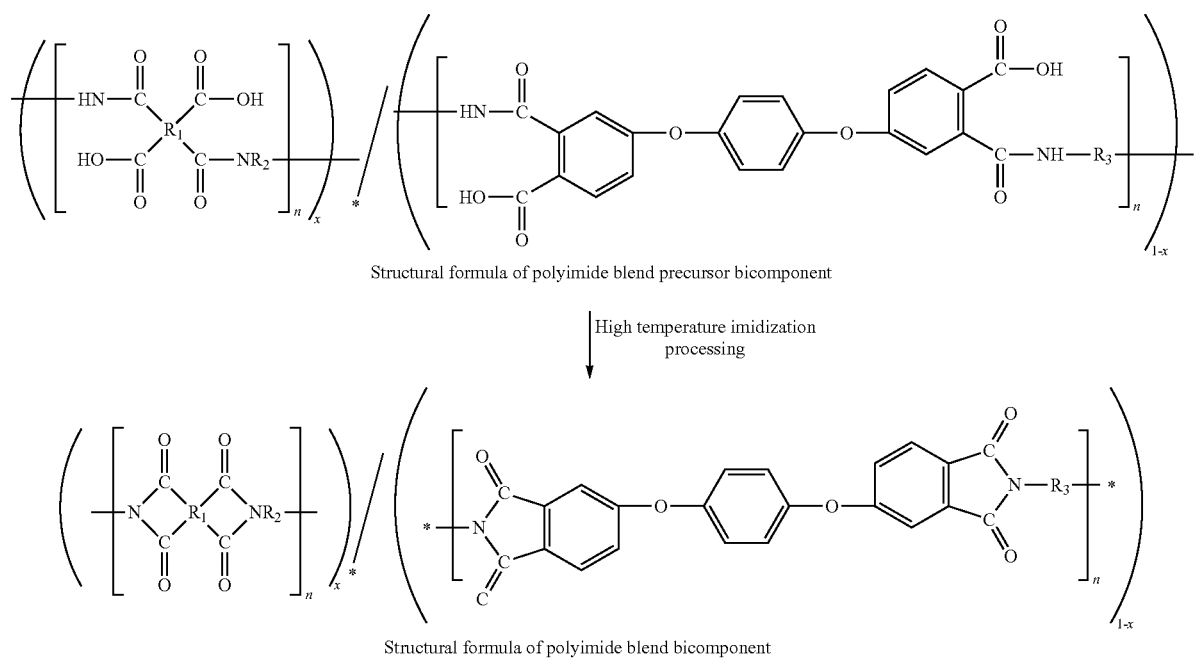

Structural formula of polyimide blend precursor bicomponent

High temperature imidization processing

Structural formula of polyimide blend bicomponent

Wherein, $R_1$ is a residue structure of an aromatic ring-containing dianhydride, $R_2$ and $R_3$ are residue structures of aromatic ring-containing dianhydrides, and $R_2$ and $R_3$ can be the same or different. n is a number of the repeating units of a polymer, and is between 50-150.

The larger the n value, the larger the molecular weight of the polymer; X is a positive number smaller than or equal to 1, X represents the composition of the nonmeltable polyimide precursor in the blend, and (1−X) represents the composition of the meltable polyimide precursor in the blend.

In particular, $R_1$ is one of the following structures:

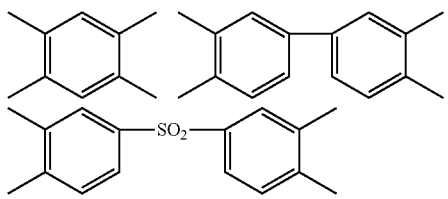

pyromellitic dianhydride residue group
biphenyl dianhydride residue group
diphenyl sulfone dianhydride residue group

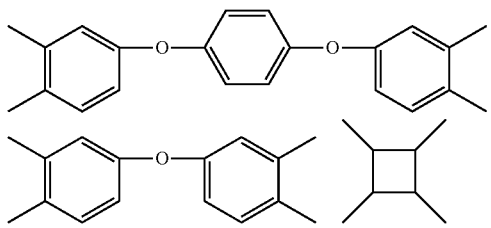

triphenyl diether dianhydride residue group
diphenyl ether dianhydride residue group
cyclobutane dianhydride residue group

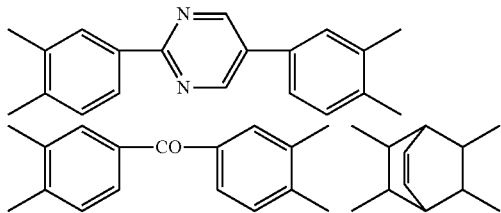

2,6-pyrimidine bisbiphenyl dianhydride residue group
diphenyl ketone dianhydride residue group
3,6-bridged alkene cyclohexane tetracarboxylic dianhydride residue group

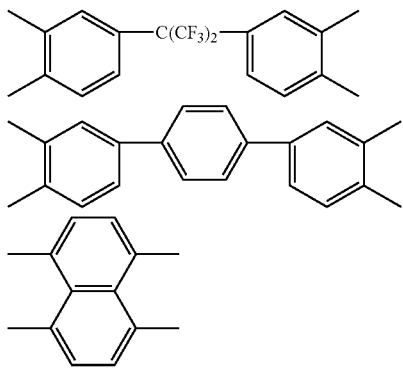

bistrifluoromethyl diphenyl methane tetracarboxylic dianhydride residue group
terphenyl tetracarboxylic dianhydride residue group
naphthalene tetracarboxylic dianhydride residue group

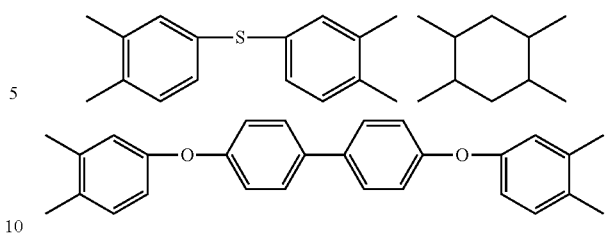

thioether tetracarboxylic dianhydride residue group
cyclohexane tetracarboxylic dianhydride residue group
diphenoxy biphenyl tetracarboxylic dianhydride residue group

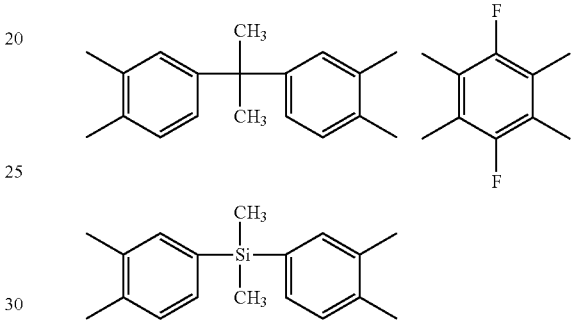

dimethyl diphenyl methane tetracarboxylic dianhydride residue group
difluoro pyromellitic dianhydride residue group
dimethyl diphenyl silane tetracarboxylic dianhydride residue group $R_2$ is one of following structures:

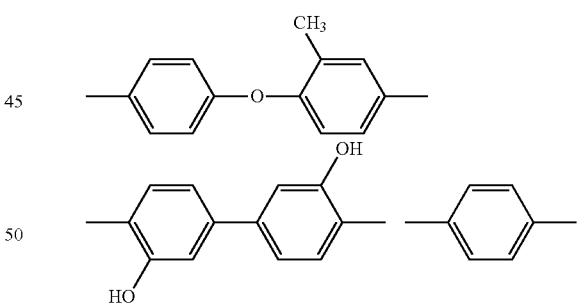

2-methyl ether diamine residue group
3,3'-dihydroxy diphenyl diamine residue group
p-phenylene diamine residue group

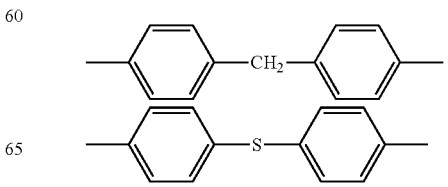

-continued

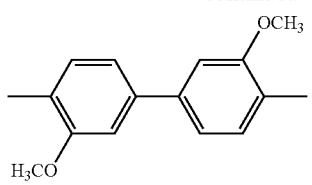

diphenyl methane diamine residue group
thioether diamine residue group
3,3'-dimethoxy biphenyl diamine residue group

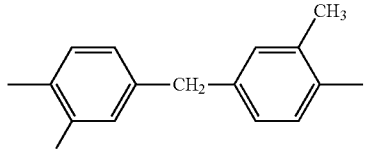

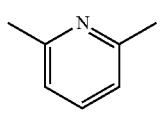

terphenyl diamine residue group
3,3'-dimethyl diphenyl methane diamine residue group
2,6-pyridine diamine residue group

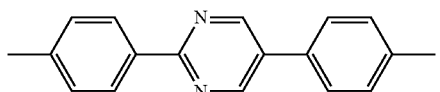

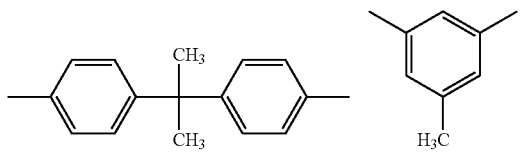

2,6-pyridine biphenyl diamine residue group
dimethyl diphenyl methane diamine residue group
5-methyl m-phenylene diamine residue group

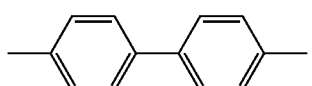

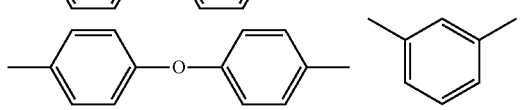

biphenyl diamine residue group
diphenyl ether diamine residue group
m-phenylene diamine residue group $R_3$ is one of following structures:

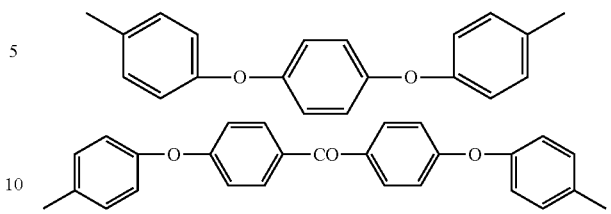

triphenyl diether diamine residue group
4,4'-diphenoxy diphenyl ketone diamine residue group

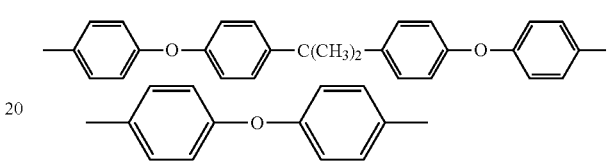

4,4'diphenoxy bisphenol A diamine residue group
diphenyl ether diamine residue group

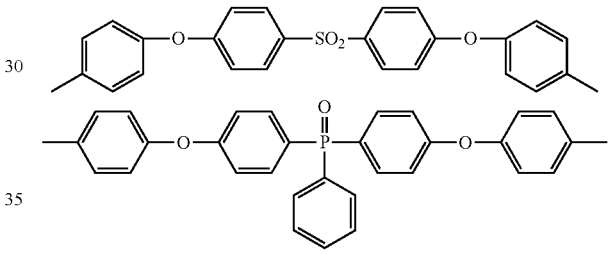

4,4'diphenoxy diphenyl sulfone diamine residue group
diphenoxy triphenyl phosphine oxide diamine residue group For the polyimide blend nanofibre of the invention, aromatic ring-containing diamines and dianhydrides are used as raw materials, to synthesize polyamide acids with appropriate intrinsic viscosities; the solutions of these two polyimide acids (polyimide precursors) are mixed uniformly under mechanical stirring at a certain proportion; the mixture solution is prepared into a polyamide acid nanofibre porous membrane by high-voltage electrostatic spinning technique, and imidized at a high temperature above 300° C. to obtain a polyimide blend nanofibre porous membrane or nonwoven fabric, which is used as the battery separator of a lithium ion battery.

The polyimide blend nanofibre is manufactured from a bicomponent precursor of a polyimide precursor nonmeltable at a high temperature and a polyimide precursor meltable at 300-400° C. by electrostatic spinning and a high-temperature imidization treatment. The key to this is that the component nonmeltable at a high temperature functions to support the structure of the nanofibre, and maintains a high-porosity network structure formed by the nanofibre, the meltable component plays an adhesion action owing to melting at a high temperature, and allows good adhesion to be formed in most of nanofibre crossed positions, as seen in FIG. 1, thereby enduing the formed polyimide blend nanofibre porous membrane or nonwoven fabric with characteristics, such as good resistance to rubbing and high temperature, high porosity and a certain mechanical strength, and overcoming critical defects of the electrospun nanofibre membrane, such as fuzzing due to rubbing, easy layering, low mechanical strength, etc.

FIG. 1 shows comparative scanning electronic microscope images of a polyimide blend nanofibre porous membrane and a single component polyimide nanofibre porous membrane of example 2 and example 11 in the present invention. In this situation, A and B are the structure in the electro-spun nanofibre porous membranes of a polyimide blend, and there is remarkable adhesion in the crossed positions of the fibres in A and B, (see position marked by a circular ring in FIG. B); C and D show the structures in the electro-spun nanofibre porous membranes of a nonmeltable single component polyimides, when X=1 in the above structure formula.

The polyimide blend nanofibre of the invention has the following characteristics: a fiber diameter of 50-1000 nm, a decomposition temperature of higher than 500° C., a melting temperature of higher than 300° C., a porosity of higher than 75%, mechanical strength of 10-50 Mpa, being completely insoluble in organic solvents, and electrical breakdown strength of higher than 10 V/μm. The electrostatic spun polyimide nanofibre porous membrane or nonwoven fabric with such characteristics is resistant to a high temperature, thermal shrinkage, chemical corrosion, and high-voltage high-current overcharge, is suitable to be used as safe battery separators and safe super capacitor separators, and is widely used in various high-capacity and high-power situations, such as automobile power.

BRIEF DESCRIPTION OF THE DRAWINGS

FIG. 1 shows comparison of scanning electronic microscope images of the polyimide blend nanofiber porous membrane and single-component polyimide nanofiber porous membrane of the present invention. FIGS. A and B show the scanning electronic microscope images of the bicomponent polyimide blend nanofiber porous membrane of the present invention; and FIGS. C and D show the scanning electronic microscope images of the single-component non-meltable polyimide nanofiber porous membrane of the present invention when X=1 in the structural formula of the bicomponent blend of the present invention.

DETAILED DESCRIPTION OF THE EMBODIMENTS

The following embodiments will help those of ordinary skill in the art to further understand the invention, but do not limit the invention in any way.

Embodiment 1

Preparation of Biphenyl Dianhydride/P-Phenylene Diamine//Triphenyl Diether Dianhydride/Diphenyl Ether Diamine Polyimide Blend (BPDA/PPD//HQDPA/ODA PI Blend) Nanofiber Battery Separator (1) polymer synthesis and electrospinning: a certain amount of purified biphenyl dianhydride (BPDA) and p-phenylene diamine (PPD) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution ($A_{1-1}$) with a mass concentration of 5% and an absolute viscosity of 4.7 Pa·S; similarly, a certain amount of purified triphenyl diether dianhydride (HQDPA) and diphenyl ether diamine (ODA) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{1-2}$) with a mass concentration of 5% and an absolute viscosity of 3.8 Pa·S. The polyamic acid solutions $A_{1-1}$ and $A_{1-2}$ were mixed at a ratio of 8:2, and mechanically stirred to uniform to form a blend solution of the two precursors with an absolute viscosity of 4.3 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 100-300 nm, tensile strength of the nanofiber membrane was 18 MPa, elongation at break was 12%, glass transition temperature was 292° C., thermal decomposition temperature was 540° C., porosity of the nanofiber membrane was 85.6%, and specific surface area of the nanofiber membrane was 38.6 m²/g.

Embodiment 2

Preparation of Biphenyl Dianhydride/Biphenyl Diamine//Triphenyl Diether Dianhydride/Diphenyl Ether Diamine Polyimide Blend (BPDA/Bz//HQDPA/ODA PI Blend) Nanofiber Battery Separator (1) polymer synthesis and electrospinning: a certain amount of purified biphenyl dianhydride (BPDA) and biphenyl diamine (Bz) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution ($A_{2-1}$) with a mass concentration of 5% and an absolute viscosity of 6.1 Pa·S; similarly, a certain amount of purified triphenyl diether dianhydride (HQDPA) and diphenyl ether diamine (ODA) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{2-2}$) with a mass concentration of 5% and an absolute viscosity of 3.7 Pa·S. The polyamic acid solutions $A_{2-1}$ and $A_{2-2}$ were mixed at a ratio of 7:3, and mechanically stirred to uniform to form a blend solution of the two precursors with an absolute viscosity of 5.2 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 150-400 nm, tensile strength of the fiber membrane was 21 MPa, elongation at break was 10%, glass transition temperature was 285° C., thermal decomposition temperature was 526° C., porosity of the nanofiber membrane was 83.5%, and specific surface area of the nanofiber membrane was 37.9 $m^2/g$.

Embodiment 3

Preparation of Pyromellitic Dianhydride/Diphenyl Ether Diamine//Triphenyl Diether Dianhydride/Diphenyl Ether Diamine Polyimide Blend (PMDA/ODA//HQDPA/ODA PI Blend) Nanofiber Battery Separator (1) polymer synthesis and electrospinning: a certain amount of purified pyromellitic dianhydride (PMDA) and biphenyl ether diamine (ODA) at a molar ratio of 1:1 and an appropriate amount of the solvent N,N-dimethyl formamide (DMF) were taken, and reacted in a polymerization kettle under stiffing at 5° C. for 12 hours to obtain a non-meltable polyimide precursor (polyamic acid) solution ($A_{3-1}$) with a mass concentration of 5% and an absolute viscosity of 5.4 Pa·S; similarly, a certain amount of purified triphenyl diether dianhydride (HQDPA) and diphenyl ether diamine (ODA) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{3-2}$) with a mass concentration of 5% and an absolute viscosity of 3.8 Pa·S. The polyamic acid solutions $A_{3-1}$ and $A_{3-2}$ were mixed at a ratio of 8:2, and mechanically stirred to uniform to form a blend solution of the two precursors with an absolute viscosity of 4.5 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 100-300 nm, tensile strength of the nanofiber membrane was 14 MPa, elongation at break was 8%, glass transition temperature was 288° C., thermal decomposition temperature was 508° C., porosity of the nanofiber membrane was 84.2%, and specific surface area of the nanofiber membrane was 38.4 $m^2/g$.

Embodiment 4

Preparation of Diphenylsulfone Dianhydride/Biphenyl Ether Diamine//Triphenyl Diether Dianhydride/4,4'-Diphenoxy Diphenylsulfone Diamine Polyimide Blend (DSDA/ODA//HQDPA/BAPS PI Blend) Nanofiber Battery Separator (1) polymer synthesis and electrospinning: a certain amount of purified diphenylsulfone dianhydride (DSDA) and biphenyl ether diamine (ODA) at a molar ratio of 1:1 and an appropriate amount of the solvent N,N-dimethyl formamide (DMF) were taken, and reacted in a polymerization kettle under stiffing at 5° C. for 12 hours to obtain a non-meltable polyimide precursor (polyamic acid) solution ($A_{4-1}$) with a mass concentration of 5% and an absolute viscosity of 5.5 Pa·S; similarly, a certain amount of purified triphenyl diether dianhydride (HQDPA) and 4,4'-diphenoxy diphenyl sulfone diamine (BAPS) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{4-2}$) with a mass concentration of 5% and an absolute viscosity of 4.0 Pa·S. The polyamic acid solutions $A_{4-1}$ and $A_{4-2}$ were mixed at a ratio of 7:3, and mechanically stirred to uniform to form a blend solution of the two precursors with an absolute viscosity of 4.8 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 150-400 nm, tensile strength of the nanofiber membrane was 18 MPa, elongation at break was 12%, glass transition temperature was 280° C., thermal decomposition temperature was 520° C., porosity of the nanofiber membrane was 83.5%, and specific surface area of the nanofiber membrane was 37.4 $m^2/g$.

Embodiment 5

Preparation of Biphenyl Dianhydride/Pyrimidine Biphenyl Diamine//Triphenyl Diether Dianhydride/Diphenyl Ether Diamine Polyimide Blend (BPDA/PRM//HQDPA/ODA PI Blend) Nanofiber Battery Separator (1) polymer synthesis and electrospinning: a certain amount of purified biphenyl dianhydride (BPDA) and 2,6-pyrimidine biphenyl diamine (PRM) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution ($A_{5-1}$) with a mass concentration of 5% and an absolute viscosity of 7.2 Pa·S; similarly, a certain amount of purified triphenyl diether dianhydride (HQDPA) and diphenyl ether diamine (ODA) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{5-2}$) with a mass concentration of 5% and an absolute viscosity of 3.8 Pa·S. The polyamic acid solutions $A_{5-1}$ and $A_{5-2}$ were mixed at a ratio of 7:3, and mechanically stirred to uniform to form a blend solution of the two precursors with an absolute viscosity of 5.8 Pa·S; it was subjected to electrostatic spinning in an electric field with an electric field strength of 200 kV/m;

a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 150-400 nm, tensile strength of the nanofiber membrane was 26 MPa, elongation at break was 14%, glass transition temperature was 286° C., thermal decomposition temperature was 528° C., porosity of the nanofiber membrane was 84.4%, and specific surface area of the nanofiber membrane was 37.8 m$^2$/g.

Embodiment 6

Preparation of Pyromellitic Dianhydride/Dihydroxy Biphenyl Diamine//Triphenyl Diether Dianhydride/Diphenyl Ether Diamine Polyimide Blend (PMDA/DHB//HQDPA/ODA PI Blend) Nanofiber Battery Separator (1) polymer synthesis and electrospinning: a certain amount of purified pyromellitic dianhydride (PMDA) and 3,3'-dihydroxy biphenyl diamine (DHB) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution ($A_{6-1}$) with a mass concentration of 5% and an absolute viscosity of 5.8 Pa·S; similarly, a certain amount of purified triphenyl diether dianhydride (HQDPA) and diphenyl ether diamine (ODA) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{6-2}$) with a mass concentration of 5% and an absolute viscosity of 3.7 Pa·S. The polyamic acid solutions $A_{6-1}$ and $A_{6-2}$ were mixed at a ratio of 7:3, and mechanically stirred to uniform to form a blend solution of the two precursors with an absolute viscosity of 4.8 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 100-300 nm, tensile strength of the nanofiber membrane was 16 MPa, elongation at break was 8%, glass transition temperature was 292° C., thermal decomposition temperature was 518° C., porosity of the nanofiber membrane was 85.1%, and specific surface area of the nanofiber membrane was 39.0 m$^2$/g.

Embodiment 7

Preparation of Dipenyl Ketone Dianhydride/Biphenyl Diamine//Triphenyl Diether Dianhydride/Diphenyl Ether Diamine Polyimide Blend (BTDA/Bz//HQDPA/ODA PI Blend) Nanofiber Battery Separator (1) polymer synthesis and electrospinning: a certain amount of purified dipenyl ketone dianhydride (BTDA) and biphenyl diamine (Bz) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution ($A_{7-1}$) with a mass concentration of 5% and an absolute viscosity of 4.7 Pa·S; similarly, a certain amount of purified triphenyl diether dianhydride (HQDPA) and diphenyl ether diamine (ODA) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{7-2}$) with a mass concentration of 5% and an absolute viscosity of 3.6 Pa·S. The polyamic acid solutions $A_{7-1}$ and $A_{7-2}$ were mixed at a ratio of 7:3, and mechanically stirred to uniform to form a blend solution of the two precursors with an absolute viscosity of 3.9 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 80-250 nm, tensile strength of the nanofiber membrane was 12 MPa, elongation at break was 11%, glass transition temperature was 276° C., thermal decomposition temperature was 509° C., porosity of the nanofiber membrane was 82.5%, and specific surface area of the nanofiber membrane was 40.0 m$^2$/g.

Embodiment 8

Preparation of Diphenyl Ether Dianhydride/P-Phenylene Diamine//Triphenyl Diether Dianhydride/Diphenyl Ether Diamine Polyimide Blend (ODPA/PPD//HQDPA/ODA PI Blend) Nanofiber Battery Separator (1) polymer synthesis and electrospinning: a certain amount of purified diphenyl ether dianhydride (ODPA) and p-phenylene diamine (PPD) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution ($A_{8-1}$) with a mass concentration of 5% and an absolute viscosity of 4.9 Pa·S; similarly, a certain amount of purified triphenyl diether dianhydride (HQDPA) and diphenyl ether diamine (ODA) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{8-2}$) with a mass concentration of 5% and an absolute viscosity of 3.4 Pa·S. The polyamic acid solutions $A_{8-1}$ and $A_{8-2}$ were mixed at a ratio of 7:3, and mechanically stirred to uniform to form a blend solution of the two precursors with an absolute viscosity of 3.8 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 50-200 nm, tensile strength of the nanofiber membrane was 10 MPa, elongation at break was 8%, glass transition temperature was 272° C., thermal decomposition temperature was 506° C., porosity of the nanofiber membrane was 81.2%, and specific surface area of the nanofiber membrane was 41.3 $m^2/g$.

Embodiment 9

Preparation of Pyromellitic Dianhydride/3,3'-Dimethyl Diphenylmethane Diamine//Triphenyl Diether Dianhydride/Diphenyl Ether Diamine Polyimide Blend (PMDA/OTOL//HQDPA/ODA PI Blend) Nanofiber Battery Separator (1) polymer synthesis and electrospinning: a certain amount of purified pyromellitic dianhydride (PMDA) and 3,3'-dimethyl diphenylmethane diamine (OTOL) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution ($A_{9-1}$) with a mass concentration of 5% and an absolute viscosity of 4.8 Pa·S; similarly, a certain amount of purified triphenyl diether dianhydride (HQDPA) and diphenyl ether diamine (ODA) and an appropriate amount of the solvent N,N-dimethyl formamide (DMF) were taken, and reacted in a polymerization kettle under stirring at 5° C. for 12 hours to obtain a meltable polyimide precursor (polyamic acid) solution ($A_{9-2}$) with a mass concentration of 5% and an absolute viscosity of 3.8 Pa·S. The polyamic acid solutions $A_{9-1}$ and $A_{9-2}$ were mixed at a ratio of 7:3, and mechanically stirred to uniform to form a blend solution of the two precursors with an absolute viscosity of 4.2 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 80-250 nm, tensile strength of the nanofiber membrane was 12 MPa, elongation at break was 8%, glass transition temperature was 282° C., thermal decomposition temperature was 505° C., porosity of the nanofiber membrane was 81.1%, and specific surface area of the nanofiber membrane was 40.2 $m^2/g$.

Embodiment 10

Preparation of Pyromellitic Dianhydride/Diphenylmethane Diamine//Triphenyl Diether Dianhydride/4,4'-Diphenoxy Diphenylsulfone Diamine Polyimide Blend (PMDA/MDA//HQDPA/BAPS PI Blend) Nanofiber Battery Separator (1) polymer synthesis and electrospinning: a certain amount of purified pyromellitic dianhydride (PMDA) and diphenylmethane diamine (MDA) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution ($A_{10-1}$) with a mass concentration of 5% and an absolute viscosity of 5.5 Pa·S; similarly, a certain amount of purified triphenyl diether dianhydride (HQDPA) and 4,4'-diphenoxy diphenylsulfone diamine (BAPS) and an appropriate amount of the solvent N,N-dimethyl formamide (DMF) were taken, and reacted in a polymerization kettle under stiffing at 5° C. for 12 hours to obtain a meltable polyimide precursor (polyamic acid) solution ($A_{10-2}$) with a mass concentration of 5% and an absolute viscosity of 4.1 Pa·S. The polyamic acid solutions $A_{10-1}$ and $A_{10-2}$ were mixed at a ratio of 8:2, and mechanically stirred to uniform to form a blend solution of the two precursors with an absolute viscosity of 4.8 Pa·S; it was subjected to electrostatic spinning in an electric field with an electric field strength of 200 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 100-300 nm, tensile strength of the nanofiber membrane was 15 MPa, elongation at break was 10%, glass transition temperature was 290° C., thermal decomposition temperature was 510° C., porosity of the nanofiber membrane was 84.8%, and specific surface area of the nanofiber membrane was 39.3 $m^2/g$.

Embodiment 11

Preparation of Biphenyl Dianhydride/P-Phenylene Diamine Polyimide (BPDA/PPD PI) Nanofiber Battery Separator (1) polymer synthesis and electrospinning: a certain amount of purified biphenyl dianhydride (BPDA) and p-phenylene diamine (PPD) at a molar ratio of 1:1 and an appropriate amount of the solvent N,N-dimethyl formamide (DMF) were taken, and reacted in a polymerization kettle under stirring at 5° C. for 12 hours to obtain a non-meltable polyimide precursor (polyamic acid) solution with a mass concentration of 5% and an absolute viscosity of 4.7 Pa·S; it was subjected to electrostatic spinning in an electric field with an electric field strength of 300 kV/m; a blend polyamic acid nanofiber membrane was collected by using a stainless steel roller with a diameter of 0.3 meter as a collector.

(2) imidization: the blend polyamic acid nanofiber membrane obtained as above was put into a high temperature furnace and heated in a nitrogen atmosphere for imidization. The temperature raising program was as follows: heating at a ramp rate of 20° C./min from room temperature to 250° C., maintaining for 30 min at this temperature, then heating at a ramp rate of 5° C./min to 370° C., maintaining for 30 min at 370° C., shutting off the power, and then naturally cooling to room temperature.

(3) performance characterization: fiber diameter was 100-300 nm, tensile strength of the nanofiber membrane was 12 MPa, elongation at break was 15%, glass transition temperature was 298° C., thermal decomposition temperature was 580° C., porosity of the nanofiber membrane was 86.9%, and specific surface area of the nanofiber membrane was 38.2 m²/g.

Experiment materials and result tests mentioned above
(I) Experiment materials:
In 11 experiment examples of the present invention, used are 6 dianhydrides and 8 diamines, 14 monomers in all, purchased by commercial channels.
1) biphenyl dianhydride [CAS number: 2420-87-3], purchased from Changzhou Sunlight Pharmaceutical Co., Ltd.;
2) triphenyl diether dianhydride [experiment product, temporarily no CAS number], purchased from Changchun Hipolyking Co. Ltd.;
3) pyromellitic dianhydride [CAS number: 89-32-7], purchased from Wuhan Hannan Tongxin chemical Co. Ltd.;
4) diphenyl sulfone dianhydride [CAS number: 2540-99-0], purchased from TCI (Shanghai) Development Co., Ltd.;
5) dipenyl ketone dianhydride [CAS number: 2421-28-5], purchased from J&K Scientific Ltd.;
6) diphenyl ether dianhydride [CAS number: 1823-59-2], purchased from Changzhou Sunchem Pharmaceutical Chemical Material Co., Ltd.;
7) 3,3'-dimethyl diphenyl methane diamine (also known as, 4,4'-diamino-3,3'-dimethyl diphenyl methane) [CAS number: 838-88-0], purchased from J&K Scientific Ltd.;
8) diphenyl methane diamine (also known as, 4,4'-diamino diphenylmethane) [CAS number: 101-77-9], purchased from J&K Scientific Ltd.;
9) p-phenylene diamine [CAS number: 106-50-3], purchased from Zhejiang Fusheng Holding Group Co., Ltd.;
10) diphenyl ether diamine [CAS number: 101-80-4], purchased from Changzhou Sunlight Pharmaceutical Co., Ltd.;
11) Biphenyl diamine (also known as, 4,4'-diaminodiphenyl), [CAS number: 92-87-5], purchased from China Paini Chemical Reagent Factory;
12) 4,4'-diphenoxydiphenyl sulfone diamine (also known as, 4,4'-bia(amino phenoxy)diphenyl sulfone) [CAS number: 13080-89-2], purchased from Suzhou Yinsheng Chemical Co., Ltd.;
13) pyridine biphenyl diamine [experiment product, temporarily no CAS number], (synthesized in our laboratory);
14) dihydroxy biphenyl diamine (also known as: 3,3'-dihydroxy benzidine) [CAS number: 2373-98-0], purchased from Chemexcel (Zhangjiakou) Fine Chemicals Co., Ltd.

(II) Experimental result, test and characteristic
The experimental results of the 11 experiment examples in the present invention are conventionally tested and characterized by following instrumentations.
1) The absolute viscosities of the polymer solution and the spinning solution are determined by an NDJ-8S viscometer (Shanghai Precision & Scientific Instrument Co., Ltd.);
2) The diameter of the electrospun nanofibre is determined by a scanning electron microscope (SEM) VEGA 3 SBU (Czech Republic);
3) The thermal decomposition temperature of the polyimide blend nanofibre is determined by a WRT-3P thermogravimetic analyzer (TGA) (Shanghai Precision & Scientific Instrument Co., Ltd.);
4) The mechanical properties (such as strength, elongation at break, etc.) of the polyimide blend nanofibre porous membrane or the nonwoven fabric is determined by a CMT8102 micro control electronic universal tester (Shenzhen SANS Material Test Co., Ltd.);
5) The vitrification temperature of the polyimide blend nanofibre porous membrane or the nonwoven fabric is determined by a Diamond dynamic mechanical analyser (DMA) (Perkin-Elmer, America);
6) The porosity of the polyimide blend nanofibre porous membrane or the nonwoven fabric is obtained by calculating via the formula below:

$$\text{porosity } \beta = [1 - (\rho/\rho o)] \times 100$$

wherein, $\rho$ is the density (g/cm3) of the polyimide blend nanofibre porous membrane or the nonwoven fabric, and $\rho o$ is the density (g/cm3) of the polyimide blend solid film (manufactured by a solution casting method);
7) The specific surface area of the polyimide blend nanofibre porous membrane or the nonwoven fabric is determined by a JW-K type pore distribution and specific surface area tester (Beijing JWGB Sci.&Tech. Co., Ltd.).

What is claimed is:
1. A polyimide blend nanofibre, comprising:
a precursor of two polyimides subjected to high-voltage electrostatic spinning and an imidization treatment, said polyimide blend precursor is composed of a polyimide blend bicomponent of a precursor of polyimide non-meltable at least up to 400° C. and a precursor of polyimide meltable at 300-400° C.,
the structure unit of said polyimide blend bicomponent is as follows:

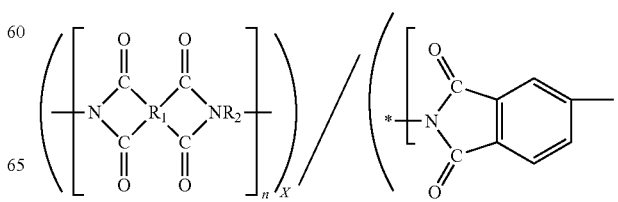

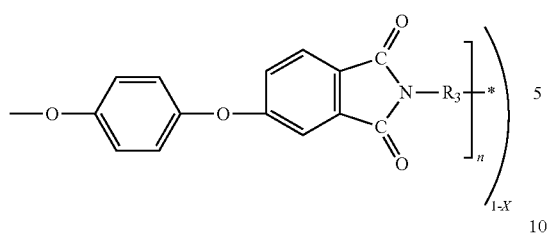

wherein, $R_1$ is an residue structure of an aromatic ring-containing dianhydride, $R_2$ and $R_3$ are residue structures of aromatic ring-containing diamines.

2. The polyimide blend nanofibre according to claim 1, characterized in that, said $R_1$ is one of the following structures:

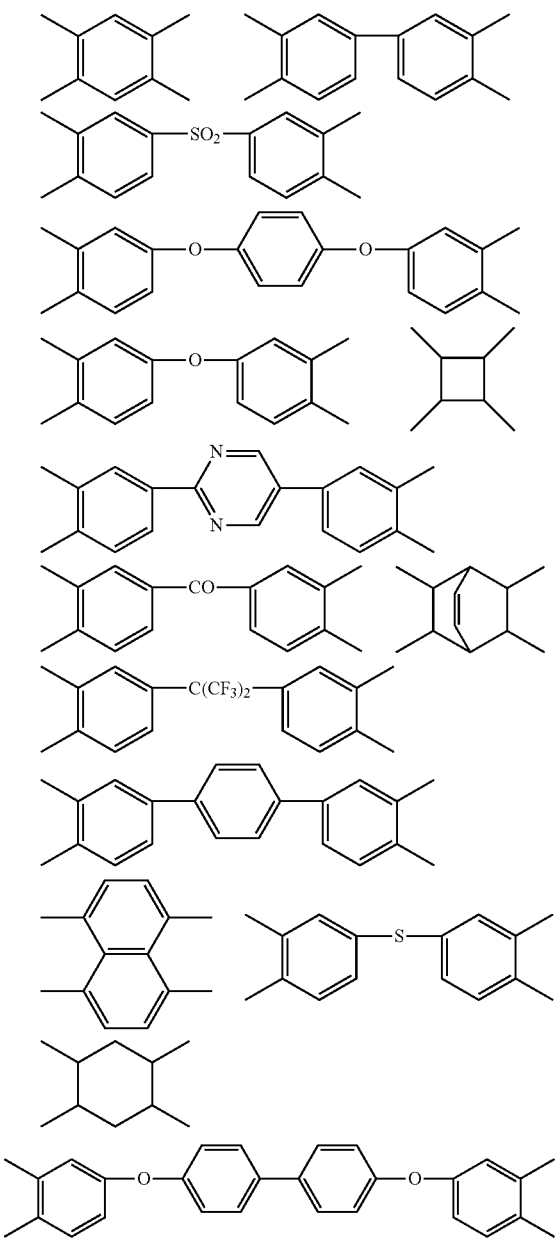

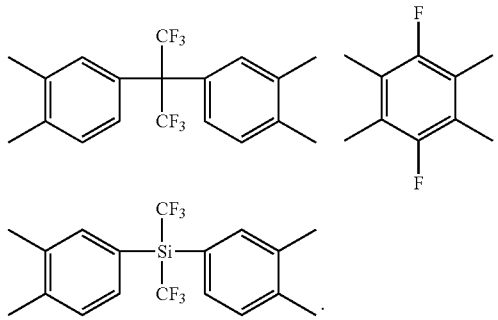

3. The polyimide blend nanofibre according to claim 1, characterized in that, said $R_2$ is one of the following structures:

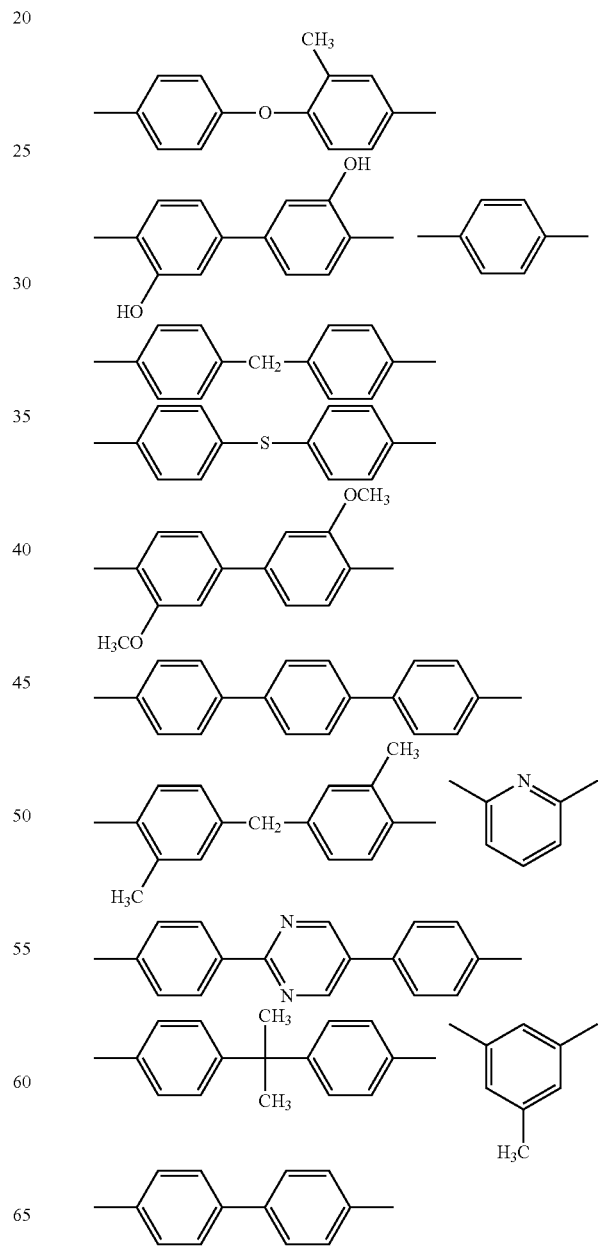

-continued

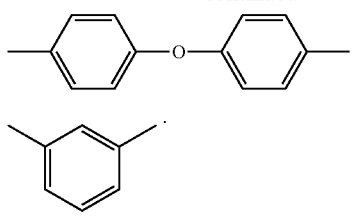

4. The polyimide blend nanofibre according to claim 1, characterized in that, said $R_3$ is one of following structures:

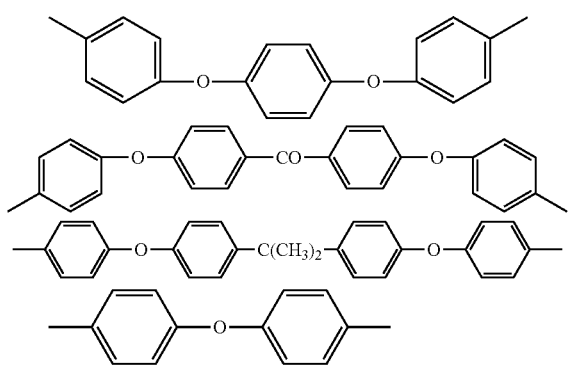

-continued

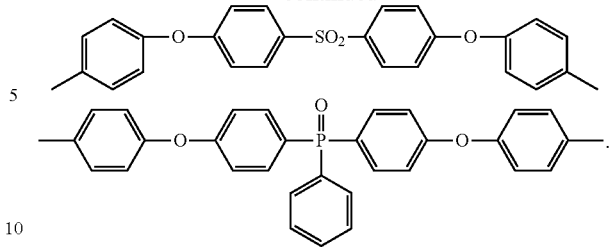

5. The polyimide blend nanofibre according to claim 1, characterized in that, the diameter of said fibre is 50-1000 nm.

6. The polyimide blend nanofibre according to claim 1, characterized in that, the decomposition temperature of said fibre is higher than 500° C. and the melt temperature thereof is higher than 300° C.

7. The polyimide blend nanofibre according to claim 1, characterized in that, the porosity of the porous membrane or nonwoven fabric composed of said fibre is higher than 75%.

8. The polyimide blend nanofibre according to claim 1, characterized in that, the mechanical strength of the porous membrane or the nonwoven fabric composed of the fibre is 10-50 MPa and the electrical breakdown strength thereof is higher than 10 V/μm.

9. A battery separator, comprising:
the porous membrane or the nonwoven fabric composed of the polyimide blend nanofibre according to claim 1.

* * * * *